Figure 1:
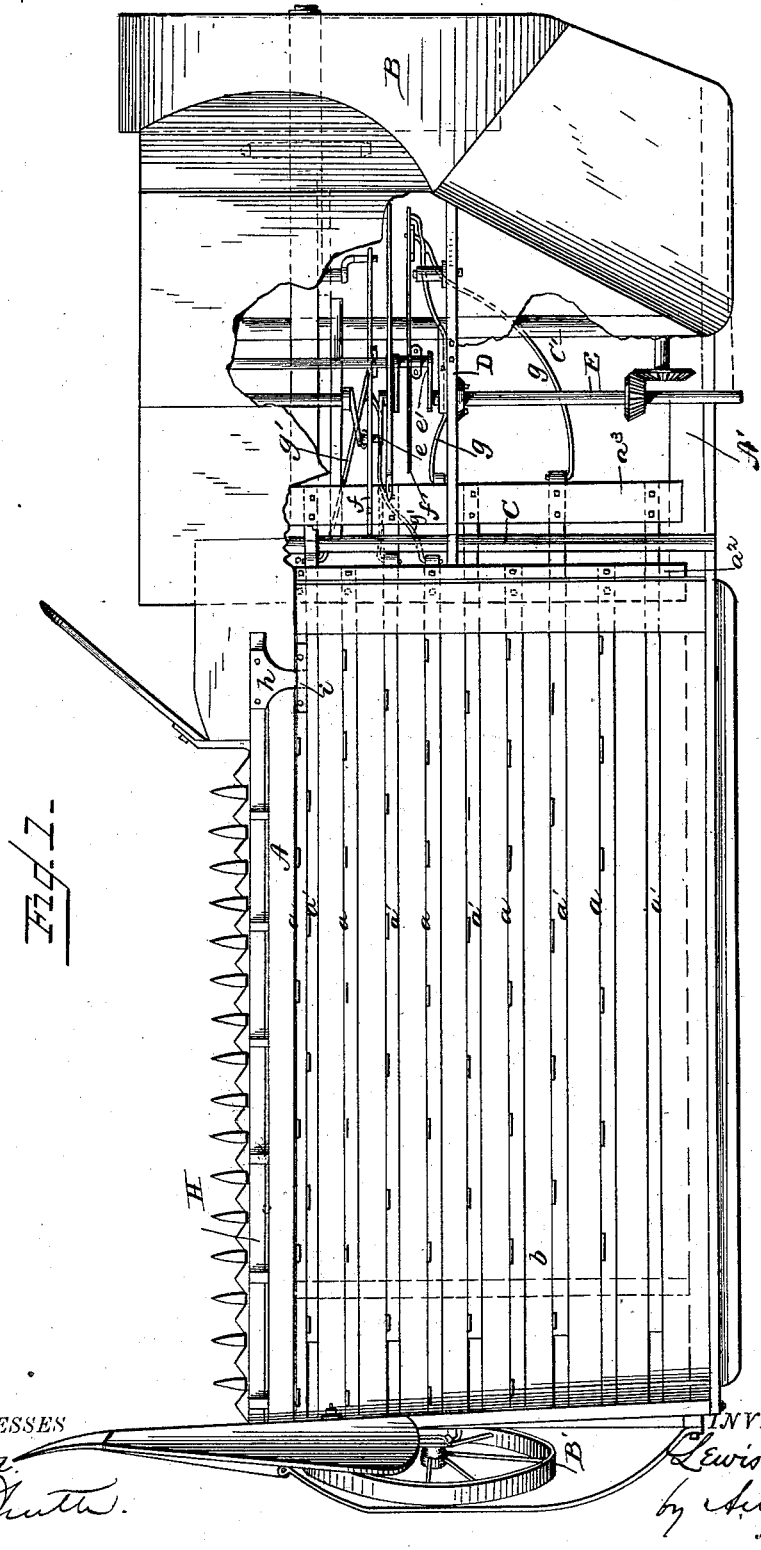

(No Model.) 2 Sheets—Sheet 1.

L. MILLER.
GRAIN BINDING HARVESTER.

No. 316,991. Patented May 5, 1885.

WITNESSES
INVENTOR
Lewis Miller
by A. M. Smith
Attorney (No Model.) 2 Sheets—Sheet 2.
L. MILLER.
GRAIN BINDING HARVESTER.
No. 316,991. Patented May 5, 1885.
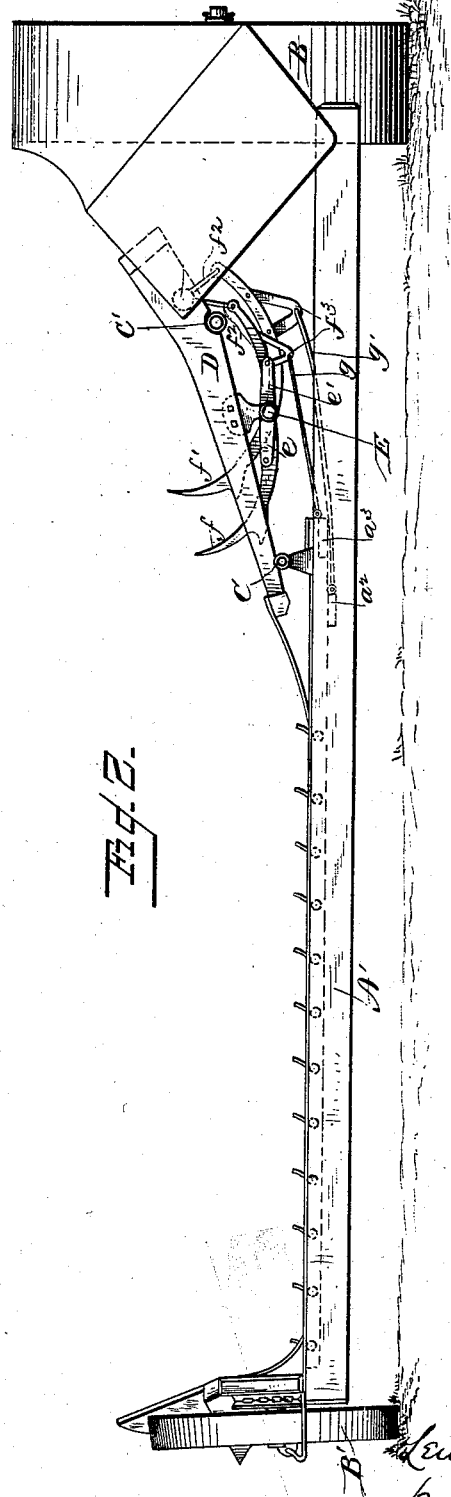

UNITED STATES PATENT OFFICE.

LEWIS MILLER, OF AKRON, OHIO.

GRAIN-BINDING HARVESTER.

SPECIFICATION forming part of Letters Patent No. 316,991, dated May 5, 1885.

Application filed June 2, 1883. (No model.)

*To all whom it may concern:*

Be it known that I, LEWIS MILLER, of Akron, county of Summit, and State of Ohio, have invented a new and useful Improvement in Grain-Binding Harvesters, of which the following is a full, clear, and exact description, reference being had to the accompanying drawings, making part of this specification.

My invention relates to the construction of the platform rake or carrier and to the means for actuating the same and the sickle-bar in that class of grain-binding harvesters in which the grain is bound upon an inclined elevating-table interposed between the grain-platform and the main driving-wheel of the machine; and it consists of a platform rake or carrier composed of two or more sets of toothed parallel bars attached at their inner ends to longitudinal bars, which are connected with and actuated from the packer-arms, which compress the grain into the desired form for binding, and in the manner of connecting the sickle or knife bar with and actuating it from the platform rake or carrier, together with certain details of construction and arrangement hereinafter described.

The machine in its organization or general arrangement is similar to that described in other applications filed by me, and will not therefore be described here any further than is necessary to an understanding of my present improvement, above referred to.

In the drawings, Figure 1 is a plan view, and Fig. 2 is a rear elevation, of so much of a grain-binding harvester as is necessary to show my improvements.

A and A' represent the front and rear platform-sills; B, the driving-wheel, and B' the grain-wheel; C C', the longitudinal tubular bars of the binder-frame, and D one of the inclined transverse bars connecting the longitudinal bars, said binder-frame being attached to the platform-sills and supporting the inclined binder-table.

E is the main binder-gear shaft or other suitable shaft, arranged longitudinally of the machine in bearings underneath the binder-frame, and provided at or near the center of its length with cranks $e$ and $e'$, through which motion is imparted to the orbitally-moving packer-arms $f$ and $f'$, operating from beneath and working up through slots in the binder-table. These packers have their heel ends connected with pendent vibrating links $f^2$, which, in connection with the cranks, serve to impart to the points of the packers a movement in an elliptical path, in a manner well understood, for causing said points to pass up through the platform and act upon and compress the grain into suitable form for binding. The packer-arms are provided near their laterally-vibrating heel ends with pendent V-shaped lugs or ears $f^3$, to each of which is attached one end of a forked pitman, $g$ or $g'$, the other end of which is connected with and serves to actuate the platform rake or carrier. The platform-rake is composed of two sets of parallel bars, one set being indicated by the letters $a$, and the other by $a'$, those of the one set, $a$, being connected at their inner ends with a bar, $a^2$, arranged at right angles to the bars $a$, and those, $a'$, of the other set with a similar bar, $a^3$, arranged on the inner side of and parallel with the bar $a^2$, with its slats or bars $a'$ passing over or under the said bar $a^2$. The outer ends of the slats or bars $a$ and $a'$ rest and slide upon a suitable supporting-bar, as at $b$; or they may be upheld by a flooring extending under them between the platform-sills, or in any other suitable manner adapting them to slide easily longitudinally. The bars $a^2$ and $a^3$ are each provided with suitable ears, through which the ends of the forked connecting-rods $g$ and $g'$ are passed for reciprocating them, together with the slats or bars $a$ and $a'$, alternately in opposite directions, as will be apparent from the arrangement on opposite sides of the shaft E of the cranks $e$ and $e'$, for actuating the packers, which in turn actuate the bars $a$ and $a'$.

By forking or branching the ends of the pitmen $g$ $g'$, which are attached to the bars $a^2$ and $a^3$, and hinging the branches separately to the bars $a^2$ or $a^3$, as shown, so that the hinges shall be in line, the effect of a broad hinge for giving steadiness of movement to the rake-bars is secured without unnecessary weight of metal, and lateral play of the parts relatively to the direction of movement of the pitmen and rake-bars is prevented.

H represents the knife or sickle bar, applied in any usual or preferred manner, and provided at its inner end with a rearwardly-projecting rigid lug or arm, $h$, which enters a socket or eye formed in the forward bar of the set $a$ of the rake-bars, or in a socketed plate, $i$, secured thereto, as shown in Fig. 1, the arrangement being such that the sickle-bar is actuated by its connection with one of the rake-bars, which in turn is actuated from one of the packer-arms, as explained.

The rake-bars $a$ and $a'$ are by preference provided with pivoted or yielding teeth, adapted to yield and pass under the grain in the outward throw of said rake-bars, and to assume an upright position for moving the grain inward on the inward throw of said bars; but any suitable construction of teeth which will adapt them to pass outward under the grain without acting upon it and to move the grain inward with them on their inward throw may be employed.

By connecting the sickle-bar with and actuating it through the platform-rake from packers, as described, a long throw or reciprocation is imparted to said bar, adapting the cutter-sections to pass each through several of the slotted guard-fingers—a movement found to be particularly adapted to the cutting of grain, and avoiding the quick or short and rapid vibration ordinarily given to the sickle-bar and the well-known injurious effect of such rapid vibration on the machine.

Having now described my improvements, what I claim as new is—

1. The platform rake or carrier composed of the toothed parallel bars, in combination with and actuated from the packer-arms operating from beneath the inclined table, substantially as described.

2. The combination, with the packer-shaft of a self-binding harvester, of the platform-rake composed of two or more sets of toothed parallel bars, each of which sets is connected with and actuated from one of the packer-arms operating from beneath the inclined binder-table, substantially as described.

3. The combination of the reciprocating platform-rake with the sickle-bar connected with and actuated by the reciprocating platform rake or carrier, substantially as described.

4. The combination of the packer-arm of the binder with the platform-rake and the sickle-bar connected with and actuated from the packer-arm through the reciprocating platform rake or carrier, substantially as described.

5. In a grain-binding harvester, the combination, with the inclined elevating and binding table arranged on the grain side of the driving-wheel, of the packer-arm operating from beneath said table, the sickle-bar, and connections whereby the latter is operated from said arm, substantially as described.

6. The combination of the inclined elevating binder-table interposed between the grain-platform and driving-wheel, the packers operating from beneath said table, and the platform-rake connected with and operated from said packers, in the manner and substantially as specified.

In testimony whereof I have hereunto set my hand this 23d day of April, A. D. 1883.

LEWIS MILLER.

Witnesses:
N. N. LEOHNER,
J. LEET YOUNG.